United States Patent [19]

Reggio et al.

[11] 4,378,374
[45] Mar. 29, 1983

[54] CHEWING GUM HAVING IMPROVED SOFTNESS

[75] Inventors: Richard A. Reggio, Yorktown Heights; Ronald P. D'Amelia, Hicksville; Walter H. Jewell, Mamaroneck, all of N.Y.; John J. Stroz, Monroe, Conn.

[73] Assignee: Nabisco Brands, Inc., Parsippany, N.J.

[21] Appl. No.: 332,625

[22] Filed: Dec. 21, 1981

[51] Int. Cl.³ .............................................. A23G 3/30
[52] U.S. Cl. ........................................ 426/3; 426/6
[58] Field of Search ................................ 426/3, 4, 5, 6

[56] References Cited

U.S. PATENT DOCUMENTS

| | | | |
|---|---|---|---|
| 3,262,784 | 7/1966 | Bucher | 426/5 |
| 3,974,293 | 8/1976 | Witzel | 426/4 |
| 3,995,064 | 11/1976 | Ehrgott | 426/3 |
| 4,064,274 | 12/1977 | Mackay et al. | 426/3 |
| 4,100,301 | 7/1978 | Friello et al. | 426/3 |
| 4,186,214 | 1/1980 | Crouse et al. | 426/3 |
| 4,187,320 | 2/1980 | Koch | 426/3 |
| 4,241,091 | 12/1980 | Stroz et al. | 426/4 |
| 4,248,894 | 2/1981 | Mackay et al. | 426/3 |

Primary Examiner—Jeanette M. Hunter
Attorney, Agent, or Firm—Richard Kornutik

[57] ABSTRACT

A chewing gum is provided having improved processability and softness. The improved properties are achieved through the use of a fatty acid or fatty acid ester softening agent, such as glycerol trioleate, in place of conventional softeners such as lecithin.

2 Claims, No Drawings

CHEWING GUM HAVING IMPROVED SOFTNESS

FIELD OF THE INVENTION

The present invention which is related to commonly-owned pending application Ser. No. 319,490, filed Nov. 9, 1981, is a chewing gum which has improved softness and is easy to process due to the presence of a unique fatty acid or fatty acid ester softening agent, such as glycerol oleates.

BACKGROUND OF THE INVENTION

Chewing gums available today generally contain a natural rubber gum base, a synthetic rubber gum base or a mixture of natural and synthetic rubber gum bases. In the case of synthetic rubber gum bases, the elastomer usually employed is styrene-butadiene copolymer which is plasticized with glycerol esters of rosin. Lecithin as well as combinations of lecithin with glycerol monostearate and corn syrup have also been used in the gum to soften the extremely firm chew imparted by the use of the ester gums in the gum base.

DESCRIPTION OF THE INVENTION

In accordance with the present invention, a chewing gum is provided which has significantly improved softness and processability over prior art chewing gums due to the presence therein of a novel softener which may include one or more fatty acids, glycerol esters of fatty acids or polyglycerol esters of fatty acids. Thus, the chewing gum of the invention will generally comprise gum base, one or more bulking agents and/or sweeteners, fillers, texture modifiers, plasticizers, other conventional chewing gum ingredients, as desired, and from about 0.1 to about 8%, and preferably from about 0.5 to about 4% by weight of the novel softener.

The unique softening agent which may be employed in the chewing gum of the invention includes fatty acids, such as oleic acid, lauric acid, lactic acid, isostearic acid, caprylic acid, capric acid or stripped coco; glycerol esters of fatty acids such as mono-, di- or triglycerol esters of any of the fatty acids listed above, with glycerol trioleate being preferred, or polyglycerol esters of fatty acids such as any of those listed above, having a hydrophilic character of HLB 2 to 13.

The chewing gum of the invention may be of the sugar-containing or sugarless variety. Examples of sweeteners which may be employed include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitol, mannitol, xylitol, mixtures thereof, as well as hydrogenated starch or dextrin, as well as sugar alcohols, such as sorbitol, mannitol, xylitol, mixtures thereof, as well as hydrogenated starch hydrolysates or isomaltitol, and mixtures of two or more of the above sugars and/or sugar alcohols.

Any of the above sugars may be present in an amount of within the range of from about 0.05 to about 90% and preferably from about 40 to about 85% by weight of the chewing gum. The sugar alcohols, where present, will be employed in an amount of from about 0.05 to about 90% and preferably from about 40 to about 85% by weight of the chewing gum.

The chewing gum of the invention may also contain in lieu of or in addition to any of the above sugars or sugar alcohols an artificial sweetener, such as, for example, aspartame, cyclamate, or a saccharin or other sweetener as set out hereinafter, the artificial sweetener being present in an amount of from 0 to about 1.5% by weight, and preferably, from about 0.05 to about 0.3% by weight of the chewing gum.

Examples of artificial sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester (aspartame), the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum of the invention may include flavoring, such as sour or fruit flavoring or non-acid or mint flavoring in an amount ranging from about 0.2 to about 2% by weight of the final chewing gum product. The flavoring may comprise synthetic flavors and oils derived from plants, leaves, flowers, fruit, etc. Representative fruit flavor adjuncts include acids, such as adipic, succinic, fumaric, citric, malic, and tartaric acids, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

The gum base will be present in an amount of within the range of from about 8 to about 40% and preferably from about 15 to about 30% by weight of the chewing gum. The gum base may contain one or more elastomers, optionally one or more ester gums, optionally one or more fillers, softeners, lubricants, waxes, texture modifiers, colorants, antioxidants and the like.

The elastomers which may be present in the gum base of the invention include styrene-butadiene copolymer, isobutylene-isoprene copolymer, polyisobutylene, natural rubber (polyisoprene) as well as other masticatory substances of natural origin, such as rubber latex solids, chicle, crown gum, nispero, rosidinha, jelutong, pendare, perillo, niger gutta, tunu, etc. The elastomer or masticatory substance will be employed in an amount within the range of from about 0.5 to about 25%, preferably from about 4 to about 15% by weight of the gum base.

The fillers may be present in an amount ranging from about 0 to about 60%, and preferably ranging from about 5 to about 45% by weight of the gum base. Examples of fillers suitable for use include, but are not limited to, calcium carbonate, aluminum hydroxide, alumina, magnesium carbonate, dicalcium phosphate, talc (3MgO.4SiO$_2$.H$_2$O), magnesium trisilicate, magnesium hydroxide, aluminum silicates and combinations thereof. Calcium carbonate is preferred. However, where acid flavors and/or acid sweeteners, such as the free acid form of saccharin, acid cyclamate or aspartame, are employed in the final chewing gum, a non-chalk filler, such as talc may be preferred.

The ester gums which are used in the gum base of the invention include any of those normally employed in conventional gum base such as hydrogenated ester gum, that is glycerol ester of hydrogenated rosin and/or dimerized ester gum, pentaerythritol ester gum, polymerized ester gum, or ester gum. The ester gums will be present in an amount within the range of from about 10 to about 50%, and preferably from about 30 to about 40% by weight of the gum base.

In preferred embodiments, the gum base will contain one or more waxes which serve as lubricants and should have a melting point of above about 35° C. The waxes will be present in an amount within the range of from about 1 to about 20%, and preferably from about 3 to about 16% based on the weight of the gum base. Examples of such waxes include paraffin wax, microcrystalline wax, carnauba wax, ozokerite wax, oricury wax and the like. Preferred waxes are microcrystalline wax, and paraffin wax emplloyed in combination so that from about 0 to about 15% (based on the weight of the gum base) of the microcrystalline wax is employed with from about 0 to about 15% (based on the weight of the gum base) of the paraffin wax. The waxes are found to reduce the tackiness of the final gum composition without significantly reducing cohesivity thereof.

The gum base may, but will preferably, contain additional softeners and/or lubricants, such as one or more hydrogenated vegetable or animal fats having a melting point above 22° C., in an amount within the range of from about 0 to about 10% and preferably from about 0.5 to about 7% by weight of the gum base. Examples of such softeners include, but are not limited to, glycerol monostearate, lecithin, coconut oil, fatty acids such as stearic acid, oleic acid, or palmitic acid, partially hydrolyzed polyvinyl esters, or mono-, di- and triglycerol esters of fatty acids as described above.

The following represents preferred chewing gum formulations in accordance with the present invention.

| Ingredient | % by Weight |
|---|---|
| Sugar Containing Chewing Gum | |
| Gum base | 10 to 30 |
| Corn syrup | 15 to 25 |
| Sugar | 50 to 70 |
| Unique softener (preferably glycerol oleates) | 0.5 to 4 |
| Flavor | 0.2 to 2 |
| Sugarless Chewing Gum | |
| Gum base | 15 to 30 |
| Sorbitol syrup (60–80% solids) | 10 to 25 |
| Sorbitol solids | 30 to 70 |
| Mannitol | 0 to 10 |
| Unique softener (preferably glycerol oleates) | 0.5 to 4 |
| Flavor | 0.2 to 2 |

The above-described chewing gums may be prepared employing conventional processing techniques.

The following Examples represent preferred embodiments of the present invention.

EXAMPLE 1

A bubble gum having the following composition is prepared as described below.

| Ingredient | Parts by Weight of the Chewing Gum |
|---|---|
| Bubble gum base | 20 |
| Sugar pulverized | 55 |
| Corn syrup 43° Be | 23 |
| Flavor | 1 |
| Glycerol trioleate | 1 |
| Color | 0.05 |

The gum base was placed in a standard dough mixer kettle equipped with sigma blades, melted at 250° F., and cooled to 180° F. The corn syrup, glycerol trioleate and color were added with mixing over a 5 minute period. Thereafter, the pulverized sugar and flavor were added according to conventional chewing gum practice and mixed for 5 minutes. The gum was discharged from the kettle and was rolled or extruded and cut into sticks or cubes.

The resulting chewing gum product was found to have excellent softness and processability. The gum when discharged from the kettle can be held for an extended period of time (3–4 hours) before lamination (rolling) without any difficulty. The resulting gum also has excellent film-forming properties and thus is capable of producing excellent bubbles.

EXAMPLE 2

A chewing gum having the following composition was prepared as described in Example 1.

| Ingredient | % by Weight of the Chewing Gum |
|---|---|
| Chewing gum base | 24 |
| Sugar pulverized | 57 |
| Corn syrup (44° Be) | 16 |
| Glycerol trioleate | 2 |
| Flavor | 1 |

The resulting chewing gum was found to have excellent softness and processability. The addition of glycerol trioleate allows extended holding times from gum making to rolling.

EXAMPLE 3

A sugarless bubble gum in accordance with the present invention, is prepared as described below from the following ingredients.

| Ingredients | Parts by Weight |
|---|---|
| Bubble gum base | 27 |
| Glycerol trioleate | 2.5 |
| Peppermint oil | 1.5 |
| Sodium saccharin | 0.1 |
| Mannitol | 5.5 |
| Sorbitol solution (70% solids) | 19.5 |
| Sorbitol powder | 43.9 |

The gum base is melted (temperature 250° F.) and placed in a standard dough mixer kettle equipped with sigma blades and cooled to 180° F. The mannitol and sorbitol powder and glycerol trioleate were added with mixing over a 5 minute period. Thereafter, the flavor, sorbitol solution, and sodium saccharin were added according to conventional chewing gum practice and mixed for 5 minutes. The gum was discharged from the kettle and was rolled, scored and cut into 3 g sticks or cubes.

The resulting chewing gum product was found to have excellent softness and improved processability. The gum when discharged from the kettle can be held for an extended period of time (3–4 hours) before lamination (rolling) without any difficulty. The resulting gum also has excellent film-forming properties and thus is capable of producing excellent bubbles.

EXAMPLE 4

A sugarless gum in accordance with the present invention was prepared as described below from the following ingredients.

| Ingredients | Parts by Weight |
| --- | --- |
| Chewing gum base | 24 |
| Glycerol trioleate | 3.5 |
| Peppermint oil | 1.5 |
| Water | 3 |
| Mannitol | 5 |
| Sorbitol solution | 22 |

| -continued | |
| --- | --- |
| Ingredients | Parts by Weight |
| Sorbitol (solid) | 41 |

The gum base was melted (temperature 270° F.) and placed in a standard dough mixer kettle equipped with sigma blades and cooled to 180° F. Glycerol trioleate, mannitol and sorbitol powder were added and mixed for 5 minutes; peppermint oil, and sorbitol solution were then added and mixed for two minutes. The gum was discharged from the kettle and was rolled, scored and cut into sticks or cubes. The so-formed chewing gum was found to have excellent softness and processability.

What is claimed is:

1. A chewing gum having improved softness and ease of processability, comprising gum base, sweetener, lubricants, and from about 0.1 to about 8% by weight of one or more softeners selected from the group consisting of acids selected from the group consisting of oleic acid, lauric acid, lactic acid, isostearic acid, caprylic acid, and capric acid, esters of said acids, mono-, di and triglycerol esters of said acids, polyglycerol esters of said acids having a hydrophobic hydrophilic character of HLB 2 to 13, stripped coco, and mixtures thereof.

2. The chewing gum base as defined in claim 1 wherein said softener is glycerol trioleate.

* * * * *